US012671218B1

(12) United States Patent
Li

(10) Patent No.: US 12,671,218 B1
(45) Date of Patent: Jun. 30, 2026

(54) CONNECTOR, CHARGING CABLE, AND ELECTRONIC DEVICE

(71) Applicant: Dongguan Xinganhui Electronic Technology Co., Ltd, Dongguan City (CN)

(72) Inventor: Bibing Li, Dongguan City (CN)

(73) Assignee: Dongguan Xinganhui Electronic Technology Co., Ltd, Dongguan City (CN)

( * ) Notice: Subject to any disclaimer, the term of this patent is extended or adjusted under 35 U.S.C. 154(b) by 0 days.

(21) Appl. No.: 19/415,867

(22) Filed: Dec. 11, 2025

(30) Foreign Application Priority Data

May 23, 2025 (CN) .......................... 202521046574.2

(51) Int. Cl.
| | |
|---|---|
| *H01R 13/44* | (2006.01) |
| *G06F 1/16* | (2006.01) |
| *H01R 13/512* | (2006.01) |
| *H01R 33/94* | (2006.01) |

(52) U.S. Cl.
CPC ............. *H01R 33/94* (2013.01); *G06F 1/166* (2013.01); *H01R 13/512* (2013.01)

(58) Field of Classification Search
CPC ........ H01R 33/94; H01R 13/512; G06F 1/166
See application file for complete search history.

(56) References Cited

U.S. PATENT DOCUMENTS

| | | | | |
|---|---|---|---|---|
| 9,502,158 | B2 | 11/2016 | Bes | |
| 11,743,589 | B2 * | 8/2023 | Antonini | .............. H04N 23/617 |
| | | | | 348/169 |

| | | | | |
|---|---|---|---|---|
| 2010/0151698 | A1 * | 6/2010 | Cheng | .................... H01R 35/04 |
| | | | | 439/13 |
| 2012/0133591 | A1 * | 5/2012 | Simmons | ................ G06F 1/169 |
| | | | | 345/169 |
| 2014/0170871 | A1 * | 6/2014 | Wu | ....................... H01R 13/447 |
| | | | | 439/131 |
| 2015/0144672 | A1 * | 5/2015 | Chang | .................... F16M 11/10 |
| | | | | 224/577 |

(Continued)

OTHER PUBLICATIONS

"Chubbycable StandLite 240W Braided Fast Charge Cable with Built-in Phone Stand T-Shaped Foldable Durable USB-C Cord 90 Degree USB C Cable Right Angle Multi-Functional Charger Cord, 4.9ft" as retrieved from the following Amazon link on Dec. 2, 2025. Date First Available: Nov. 4, 2025. The inventor(s) is directly responsible for this public disclosure. https://www.amazon.com/dp/BOFZKKLH28?th=1.

*Primary Examiner* — Abdullah A Riyami
*Assistant Examiner* — Nelson R. Burgos-Guntin
(74) *Attorney, Agent, or Firm* — Nicholas Makridakis

(57) ABSTRACT

The present invention relates to the technical field of connectors, in particular to a connector, a charging cable, and an electronic device. The connector includes a terminal and a bracket. An interface is provided on one side of the terminal, and a bracket is respectively arranged at both ends of the side of the terminal opposite to the interface. The brackets can be rotated to be stored on the side of the terminal opposite the interface, or rotated outward to form a supporting structure. By simultaneously unfolding the two brackets on the terminal, vertical support can be provided for electronic devices such as mobile phones and tablets, thereby meeting users' requirements for vertical support of such electronic devices.

7 Claims, 8 Drawing Sheets

1

(56) References Cited

U.S. PATENT DOCUMENTS

| | | | |
|---|---|---|---|
| 2016/0215926 A1* | 7/2016 | Pollex | G06F 1/1622 |
| 2017/0212557 A1* | 7/2017 | Park | G06F 1/1677 |
| 2019/0273350 A1* | 9/2019 | Okazaki | G06F 1/1632 |
| 2020/0201383 A1* | 6/2020 | Predescu | G06F 1/169 |
| 2021/0405716 A1* | 12/2021 | Tucker | G06F 1/1616 |
| 2022/0041116 A1* | 2/2022 | Lev | B60R 11/0241 |
| 2022/0147104 A1* | 5/2022 | Cho | G06F 1/1666 |
| 2023/0084805 A1* | 3/2023 | Saravis | F16M 13/04 |
| | | | 361/679.48 |

* cited by examiner

1

1

1

1

1

14

15

1221    122    121

14

15

1221

1232   1231

1238    123    1238

1231

1239    1232

1239

1312

13

13

1312

13    13

123

13

1

2

3

3

CONNECTOR, CHARGING CABLE, AND ELECTRONIC DEVICE

TECHNICAL FIELD

The present invention relates to the field of electronic device accessories, and in particular to a connector, a charging cable, and an electronic device.

BACKGROUND TECHNOLOGY

With the widespread adoption and increasing functionality of smart devices such as mobile phones and tablets, user demands for charging cables have expanded from simple charging and data transmission functions to include scenario adaptability, multifunctional integration, portability, and other features.

Although charging cables capable of supporting mobile phones are already available on the market, the supporting structures of such cables typically provide lateral support, which cannot meet users' needs for vertical support of electronic devices such as mobile phones and tablets.

SUMMARY OF THE INVENTION

In order to address the problem that the supporting direction of the supporting structures of existing charging cables cannot meet users' needs for vertical support of electronic devices such as mobile phones and tablets, the present invention provides a connector, a charging cable, and an electronic device.

The technical solution provided by the present invention is a connector, comprising a terminal and a bracket; an interface is provided on one side of the terminal, and a bracket is rotatably connected to each of the two ends of the side of the terminal opposite to the interface; the brackets are configured to rotate to be stored on the side of the terminal opposite to the interface, or to rotate outward to form a supporting structure.

Preferably, when the two brackets are stored on the side of the terminal opposite to the interface, the two brackets are in a centrally symmetrical state.

Preferably, when one of the brackets is rotated outward to provide support, a preset angle is formed between the unfolded bracket and the non-unfolded bracket; the preset angle is 70°-120°.

Preferably, the terminal further comprises an electrical connection structure and a housing, the housing surrounding the electrical connection structure, the interface being connected to the electrical connection structure and exposed on one side of the housing; the bracket comprises a rotating portion and a supporting portion, through-holes are formed at both ends of the housing corresponding to the rotating portion of each bracket, part of the rotating portion passes through the through-holes into the interior of the terminal and is rotatably connected to the terminal; a boss is provided on the rotating portion of at least one of the brackets, a groove corresponding to the boss is formed on the housing; when the rotating portion drives the supporting portion to rotate and unfold relative to the housing, the boss is driven to slide from a first end of the groove to a second end of the groove, and abuts against the groove wall at the second end.

Preferably, a rotating shaft is provided on the rotating portion, the rotating portion penetrates into the interior of the housing through the rotating shaft and is rotatably connected to the housing, the boss being disposed around the rotating shaft; positioning protrusions are arranged around the rotating shaft on the rotating portion, a set of positioning slots is correspondingly provided on the housing for each positioning protrusion, each set of positioning slots comprising two positioning slots arranged at an angle with respect to the corresponding rotating shaft; when each bracket moves from a stored state to a rotated and unfolded state, the positioning protrusion on each bracket moves from one of the positioning slots in the corresponding set of positioning slots on the housing to the other positioning slot in the same set; the positioning protrusion, the rotating shaft, and the boss on the rotating portion are linearly arranged.

Preferably, the connector further comprises a threaded member and an elastic member, the rotating shaft being hollow, the threaded member passing through the through-hole into the interior of the rotating shaft and being threadedly connected to the inner wall of the rotating shaft; the through-hole comprises a first hole and a second hole communicating with the first hole, the diameter of the first hole being larger than that of the second hole, the rotating shaft passing from the second hole into the first hole; an elastic member is sleeved over the rotating shaft within the second hole, both ends of the elastic member respectively abutting against the threaded member and the bottom wall of the second hole.

Preferably, the length of the bracket is greater than ⅔ of the overall length of the terminal and less than the overall length of the terminal.

Preferably, the interface is inclined relative to the terminal; the inclination angle of the interface relative to the terminal is 6°-15°.

The present invention also provides a charging cable to solve the above technical problem, the charging cable comprising a cable body and the connector according to any one of the preceding claims, the cable body being electrically connected to the terminal.

The present invention also provides an electronic device to solve the above technical problem, the electronic device comprising the connector according to any one of the preceding claims and an electronic device main body, the electronic device main body being electrically connected to the connector.

Compared with the prior art, the connector, charging cable, and electronic device of the present invention have the following advantages:

1. The present invention provides a connector, comprising a terminal and a bracket; an interface is provided on one side of the terminal, and a bracket is rotatably connected to each of the two ends of the side of the terminal opposite to the interface; the brackets are configured to rotate to be stored on the side of the terminal opposite to the interface, or to rotate outward to form a supporting structure. By arranging a bracket at each of the two ends of the side of the terminal opposite to the interface, when both brackets are simultaneously unfolded on the terminal, the unfolded brackets expand the width of the support, supporting the two ends of the boundary of electronic devices such as mobile phones and tablets, thereby better accommodating the high center of gravity of mobile phones, tablets, and other electronic devices when placed vertically, thus achieving vertical support for such devices and meeting users' needs for vertical support. Additionally, by deploying two brackets to support the two ends of the boundary of mobile phones, tablets, and other electronic devices, the stability of vertical support is improved. Moreover, when a single bracket is unfolded, lateral support for mobile phones, tablets, and other electronic devices can also be achieved.

2. When the two brackets of the present invention are stored on the side of the terminal opposite to the interface, the two brackets are in a centrally symmetrical state, which better fits the shape of the terminal and allows the two brackets to be fully stored within the housing without protruding beyond the terminal, thereby reducing the overall space occupied by the connector.

3. When one of the brackets of the present invention is rotated outward to provide support, a preset angle is formed between the unfolded bracket and the non-unfolded bracket, the preset angle being 70°-120°, so that a preset angle is also formed between the unfolded bracket and the electronic device connected to the interface, which facilitates supporting mobile phones, tablets, and other electronic devices with the unfolding of a single bracket.

4. The terminal of the present invention further comprises an electrical connection structure and a housing, the housing surrounding the electrical connection structure, the interface being connected to the electrical connection structure and exposed on one side of the housing; the bracket comprises a rotating portion and a supporting portion, through-holes are formed at both ends of the terminal corresponding to the rotating portion of each bracket, part of the rotating portion passes through the through-holes into the interior of the terminal and is rotatably connected to the terminal; a boss is provided on the rotating portion of at least one of the brackets, and a groove corresponding to the boss is formed on the housing; when the rotating portion drives the supporting portion to rotate and unfold relative to the terminal, the boss is driven to slide from a first end of the groove to a second end of the groove, and abuts against the groove wall at the second end. By providing a boss on the rotating portion and a groove on the terminal, the boss is located within the groove. When the bracket is in a non-unfolded, stored state, the boss is positioned at the first end of the groove; when the bracket is in a rotated and unfolded state, rotation of the rotating portion drives the boss to move within the groove from the first end to the second end and abut against the groove wall at the second end, thereby limiting the rotation of the rotating portion through contact between the boss and the groove wall at the second end, so that when the bracket laterally supports mobile phones, tablets, or other electronic devices at this angular position, the boss continuously abuts against the groove wall at the second end, improving the stability of the bracket's support and preventing the supported electronic device from tipping over.

5. In the present invention, by providing a positioning protrusion on each bracket corresponding to positioning slots at two different angular positions, when the bracket is stored or unfolded, the positioning protrusion engages with different positioning slots, thereby limiting the bracket in its current state and further improving the stability of the bracket in both the stored and unfolded supporting states. In addition, the positioning protrusion, the rotating shaft, and the boss are linearly arranged, which enables a more balanced and stable limiting effect of the rotating shaft.

6. The connector of the present invention further comprises a threaded member and an elastic member, the rotating shaft being hollow, the threaded member passing through the through-hole into the interior of the rotating shaft and being threadedly connected to the inner wall of the rotating shaft; the through-hole comprises a first hole and a second hole communicating with the first hole, the diameter of the first hole being larger than that of the second hole, the rotating shaft passing from the second hole into the first hole; an elastic member is sleeved over the rotating shaft within the second hole, both ends of the elastic member respectively abutting against the threaded member and the bottom wall of the second hole. By using the threaded member, the rotating shaft is connected to the housing, and by sleeving the elastic member over the rotating shaft, when the bracket rotates, the bracket as a whole can move along the compression direction of the spring, allowing the positioning protrusion on the rotating portion to disengage from the current positioning slot and move to another positioning slot, and after the elastic member expands, the positioning protrusion is driven to engage with the positioning slot. In this way, through the arrangement of the elastic member, the positioning protrusion can move from the current positioning slot to the next positioning slot without affecting the rotation of the bracket.

7. In the present invention, the interface is inclined relative to the terminal; the inclination angle of the interface relative to the terminal is 6°-15°, so that when mobile phones, tablets, and other electronic devices are vertically supported by the bracket in this embodiment, the devices are inclined at a certain angle relative to the supporting surface, making it easier for users to view the devices vertically.

8. The present invention also provides a charging cable, which has the same beneficial effects as the above-described connector, and is not repeated here.

9. The present invention also provides an electronic device, which has the same beneficial effects as the above-described electronic device, and is not repeated here.

BRIEF DESCRIPTION OF THE FIGURES

In order to more clearly illustrate the technical solutions of the embodiments of the present invention, the figures required in the embodiments or in the description of the prior art are briefly introduced below. It is apparent that the figures described below are only some embodiments of the present invention, and for those skilled in the art, other figures can also be obtained based on these figures without any creative effort.

REFERENCE NUMERALS

Figure 1:
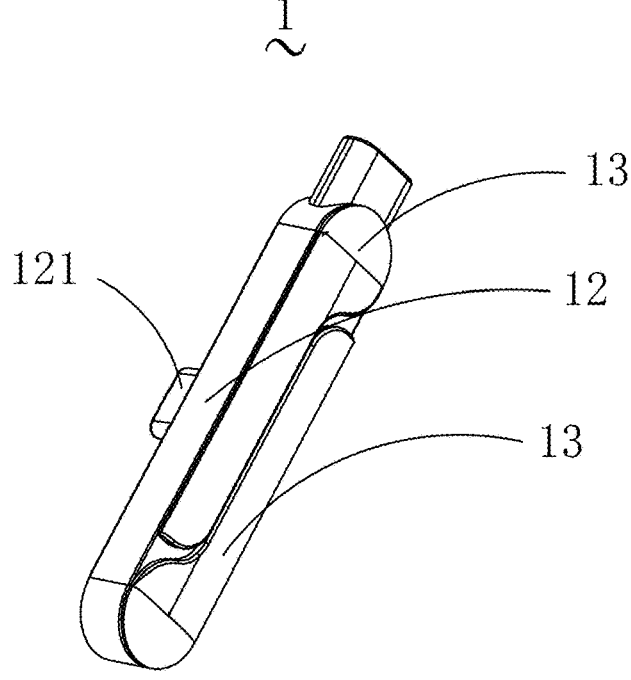
FIG. 1 is a perspective view illustrating the stored state of the bracket of the connector provided in the first embodiment of the present invention.

1, Connector; 2, Charging Cable; 3, Electronic Device; 12, Terminal; 13, Bracket; 14, Threaded Member; 15, Elastic Member; 21, Cable Body; 31, Electronic Device Main Body;

121, Interface; 122, Electrical Connection Structure; 123, Housing; 131, Rotating Portion; 132, Supporting Portion; 1221, Positioning Hole; 1231, Through-Hole; 1232, Groove; 1233, Positioning Slot; 1235, First Hole; 1236, Second Hole; 1238, First End; 1239, Second End; 1311, Boss; 1312, Rotating Shaft; 1313, Positioning Protrusion.

DETAILED EMBODIMENTS

In order to make the objectives, technical solutions, and advantages of the present invention more clear, the present invention is further described in detail below in combination with the accompanying figures and embodiments. It should be understood that the specific embodiments described herein are only intended to illustrate the present invention and are not intended to limit the scope of the present invention.

It should be noted that when an element is referred to as being "fixed to" another element, it may be directly on the other element or there may be an intermediate element present. When an element is considered to be "connected to" another element, it may be directly connected to the other element or there may be one or more intermediate elements. The terms "vertical," "horizontal," "left," "right," and similar expressions used herein are only for the purpose of description.

In the present invention, the terms "upper," "lower," "left," "right," "front," "rear," "top," "bottom," "inner," "outer," "middle," "vertical," "horizontal," "lateral," and "longitudinal" indicating orientation or positional relationships are based on the orientation or positional relationships shown in the figures. These terms are primarily intended to better describe the present invention and its embodiments and are not intended to limit the devices, elements, or components indicated to a specific orientation, nor to require construction or operation in a specific orientation.

Moreover, in addition to indicating orientation or positional relationships, some of the above terms may also be used to represent other meanings. For example, the term "upper" may, in certain circumstances, indicate a form of attachment or connection. Those skilled in the art can understand the specific meanings of these terms in the context of the present invention according to the particular circumstances.

In addition, the terms "install," "provide," "provided with," "connect," and "connected" should be understood in a broad sense. For example, the connection may be fixed or detachable, or integrally formed; it may be a mechanical connection or an electrical connection; it may be directly connected, indirectly connected through an intermediate medium, or represent internal communication between two devices, elements, or components. Those skilled in the art can understand the specific meanings of these terms in the context of the present invention according to the particular circumstances.

Referring to FIGS. 1-4, a connector 1 is provided in the first embodiment of the present invention, comprising a terminal 12 and a bracket 13; an interface 121 is provided on one side of the terminal 12, and a bracket 13 is rotatably connected to each of the two ends on the side of the terminal 12 opposite to the interface 121; the bracket 13 can be rotatably stored on the side of the terminal 12 opposite to the interface 121, or rotated outward to form a supporting structure.

Specifically, the connector 1 in this embodiment can be used for charging and/or data transmission, the interface 121 on the terminal 12 is used for connecting to an electronic device for charging and/or data transmission, and the type of the interface 121 includes, but is not limited to, USB Type-C, USB Type-A, Micro USB, and Lightning interfaces.

Specifically, on the terminal 12 connected to the electronic device, a bracket 13 can be connected to each of the two ends on the side opposite to the interface 121, that is, the two brackets 13 are rotatably connected to the terminal 12. The two brackets 13 can be stored on the surface of the terminal 12 and can be rotated outward to support electronic devices such as mobile phones and tablets connected to the terminal 12.

It should be noted that the storage and rotational unfolding of the two brackets 13 are independent. When supporting mobile phones, tablets, or other electronic devices, either a single bracket 13 can be unfolded for support, or both brackets 13 can be unfolded simultaneously. The corresponding bracket (s) 13 can be unfolded according to the specific support requirements.

It can be understood that when both brackets 13 are simultaneously unfolded on the terminal 12, the unfolded brackets 13 expand the support width, facilitating support at the two ends of the boundary of electronic devices such as mobile phones and tablets. This better accommodates the high center of gravity of mobile phones, tablets, and other electronic devices when placed vertically, thereby achieving vertical support and meeting users' needs for vertical support of such devices. In addition, by deploying two brackets 13 to support the two ends of the boundary of mobile phones, tablets, and other electronic devices, the stability of vertical support is improved. Furthermore, when a single bracket 13 is unfolded, lateral support for mobile phones, tablets, and other electronic devices can also be achieved. Therefore, the arrangement of the two brackets 13 in this embodiment enables multi-directional support for mobile phones, tablets, and other electronic devices, facilitating the fulfillment of users' support needs in different directions.

It can be understood that in this embodiment, no specific limitation is imposed on the storage of the two brackets 13 on the terminal 12. When both brackets 13 are stored on the side of the terminal 12 opposite to the interface 121, the boundaries of the two brackets 13 do not extend beyond the boundary of the terminal 12, or it is ensured that the storage of the two brackets 13 does not interfere with the connection of the connector 1 or the user' s operation.

Referring to FIG. 1, in an optional embodiment, when the two brackets 13 are stored on the side of the terminal 12 opposite to the interface 121, the two brackets 13 are in a centrally symmetrical arrangement, which helps reduce the area occupied by the two brackets 13 on the housing 123 of the terminal 12 and is more conducive to the miniaturization of the terminal 12, thereby reducing the overall volume of the terminal 12.

Figure 2:
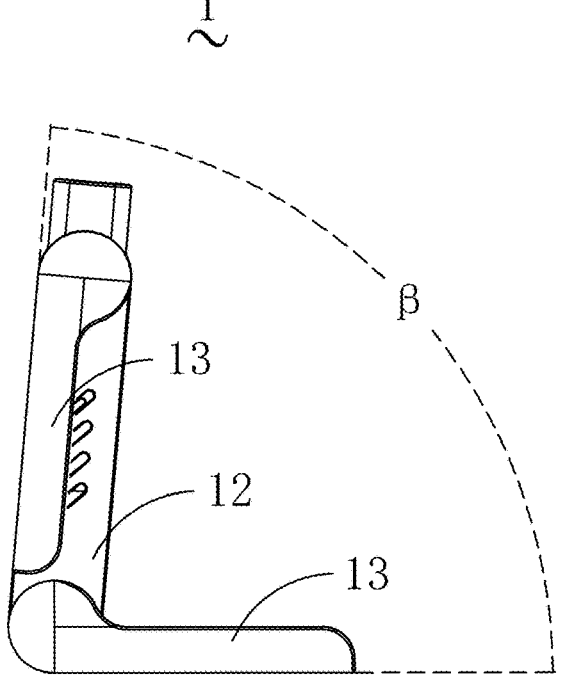
FIG. 2 is a perspective view illustrating a first unfolded state of the bracket of the connector provided in the first embodiment of the present invention.
Figure 3:
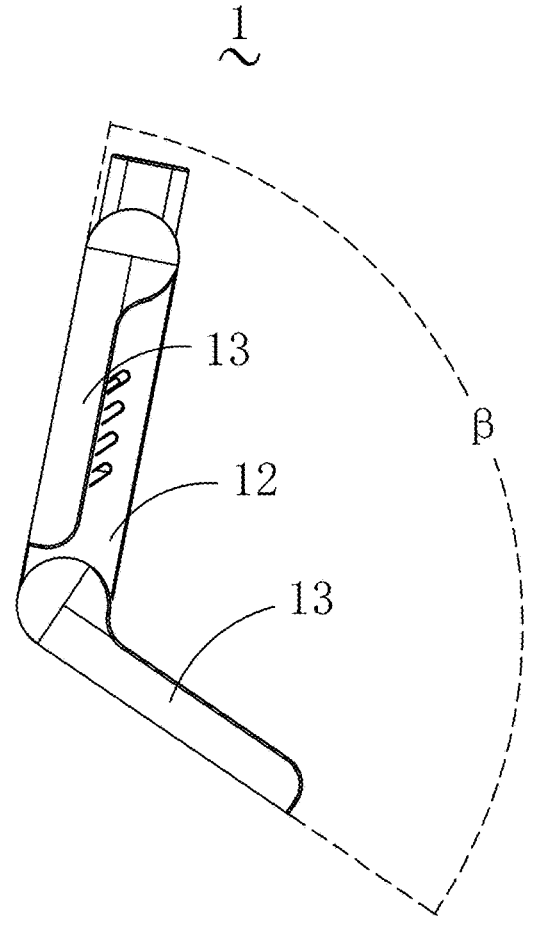
FIG. 3 is a perspective view illustrating a second unfolded state of the bracket of the connector provided in the first embodiment of the present invention.

Referring to FIGS. 2 and 3, further, when one bracket 13 is rotated outward for support, a preset angle 3 (as shown in FIGS. 2 and 3) is formed between the unfolded bracket 13 and the bracket 13 that remains folded. The preset angle β is 70°-120°.

It can be understood that when only one bracket 13 on the terminal 12 is rotated outward for support, the other bracket 13 remains stored on the terminal 12, so that a preset angle 3 is formed between the unfolded bracket 13 and the folded bracket 13, which in turn forms a preset angle f between the unfolded bracket 13 and the electronic device connected to the interface 121, facilitating user viewing. In this way, lateral support for the connected electronic device can be achieved through the unfolding of a single bracket 13.

Referring to FIG. 2, optionally, when the bracket is relatively long, the preset angle may be an acute angle, that is, within the range of 70°-90°, to ensure that when the support angle formed by the bracket is acute, the bracket can directly support the corresponding electronic device.

Referring to FIG. 3, optionally, when the bracket is relatively short, the preset angle may be an obtuse angle, that is, within the range of 90°-120°, to ensure that the support angle formed by the bracket can support the corresponding electronic device.

Figure 4:
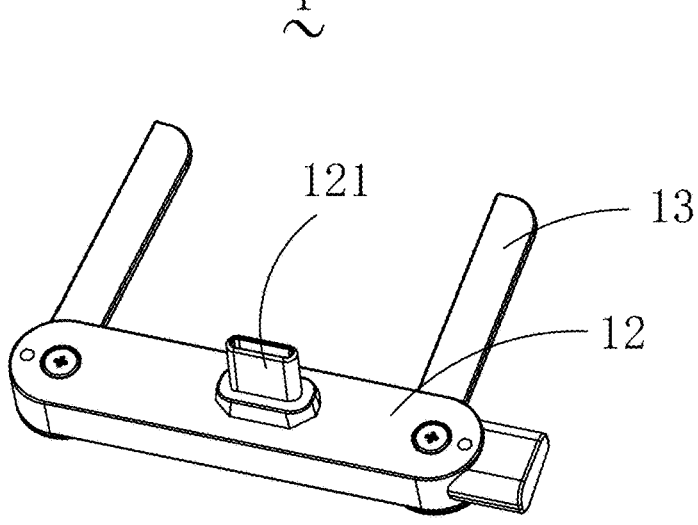
FIG. 4 is a perspective view illustrating a third unfolded state of the bracket of the connector provided in the first embodiment of the present invention.
Figure 5:
FIG. 5 is an exploded view of the connector provided in the first embodiment of the present invention.
Figure 6:
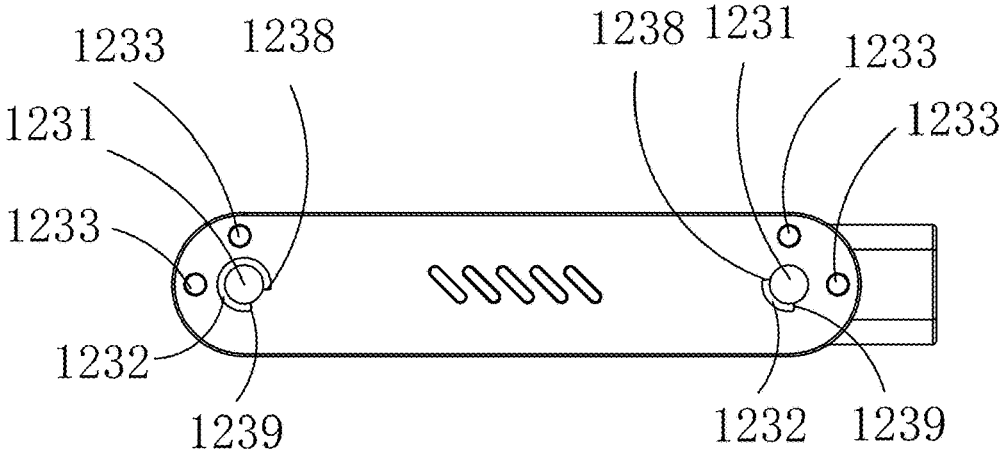
FIG. 6 is a schematic view illustrating the structure of the housing of the connector provided in the first embodiment of the present invention.

Referring to FIGS. 4-6, further, the terminal 12 also includes an electrical connection structure 122 and a housing 123. The housing 123 surrounds the electrical connection structure 122, and the interface 121 is connected to the electrical connection structure 122 and exposed on the surface of the housing 123. The bracket 13 includes a rotating portion 131 and a supporting portion 132. Through-holes 1231 are provided at both ends of the housing 123 corresponding to the rotating portion 131 of each bracket 13, and a part of the rotating portion 131 passes through the through-hole 1231 into the terminal 12 and is rotatably connected to the terminal 12. At least one rotating portion 131 of the bracket 13 is provided with a boss 1311, and a groove 1232 corresponding to the boss 1311 is provided on the housing 123. When the rotating portion 131 drives the supporting portion 132 to rotate outward relative to the housing 123, the boss 1311 slides from the first end 1238 of the groove 1232 to the second end 1239 of the groove 1232 and abuts against the groove wall at the second end 1239 of the groove 1232.

Specifically, the electrical connection structure 122 of the terminal 12 is configured for electrical communication with the interface 121. A housing 123 is provided around the electrical connection structure 122 of the terminal 12, with through-holes 1231 and grooves 1232 formed on the housing 123 to achieve rotational connection with the bracket 13 and to provide rotational limit after the bracket 13 is unfolded. In this way, the housing 123 separates the electrical connection structure 122 from the bracket 13, preventing the support and rotation of the bracket 13 from affecting charging or data transmission of the electronic device connected to the terminal 12. In addition, the housing 123 fully surrounds the electrical connection structure 122, thereby providing protection to the electrical connection structure 122.

Optionally, the two ends of the electrical connection structure 122 may extend, and corresponding positioning holes 1221 may be formed on the extended portions in alignment with the through-holes 1231 on the housing 123. In this way, the rotating shaft 1312 sequentially enters the interior of the housing 123 through the through-hole 1231 at one end of the housing 123 and passes through the positioning hole 1221, thereby limiting the position of the electrical connection structure 122 inside the housing 123 via the rotating shaft 1312, making the electrical connection structure 122 more stable within the housing 123.

It should be noted that the connecting wires inside the electrical connection structure 122 need to bypass the position of the positioning hole 1221 within the housing 123, so as to avoid affecting the electrical connection of the connector 1.

More specifically, the bracket 13 includes a rotating portion 131 rotatably connected to the terminal 12 and a supporting portion 132 connected to the rotating portion 131. The rotating portion 131 and the supporting portion 132 may be integrally formed to improve the overall strength of the bracket 13. Through-holes 1231 are formed on the terminal 12, and a part of the rotating portion 131 extends into the terminal 12 through the through-holes 1231 to rotatably connect with the terminal 12.

Optionally, a boss 1311 may be provided on the rotating portion 131 of one bracket 13, and a groove 1232 corresponding to the boss 1311 may be formed at one end of the housing 123, while the other bracket 13 and the other end of the housing 123 are not provided with such features. In this way, the boss 1311 on the bracket 13 cooperates with the groove 1232 at one end of the housing 123 to provide a rotational limit for the bracket 13 when it is unfolded for support.

Optionally, a boss 1311 may also be provided on each of the two brackets 13, and a groove 1232 may be respectively provided at both ends of the housing 123, thereby offering more options for support.

Specifically, a boss 1311 may be provided on the side of the rotating portion 131 adjacent to the housing 123, and a corresponding groove 1232 may be provided on the housing 123. The groove 1232 may be an arcuate groove, into which the boss 1311 extends. The first end 1238 may be defined as the end of the groove 1232 against which the boss 1311 abuts when the bracket 13 is stored on the surface of the terminal 12, and the second end 1239 may be defined as the other end of the groove 1232 against which the boss 1311 abuts after the bracket 13 is rotated outward.

It can be understood that when the bracket 13 is in the folded or stored state, the boss 1311 may be located at the first end 1238 of the groove 1232. When the bracket 13 is rotated outward, the rotating portion 131 can drive the boss 1311 to slide within the groove 1232, moving from the first end 1238 to the second end 1239 of the groove 1232 and abutting against the groove wall at the second end 1239. In this way, the abutment of the boss 1311 against the groove wall at the second end 1239 provides a rotational limit for the rotating portion 131, thereby limiting its rotation. When the bracket 13 laterally supports mobile phones, tablets, or other electronic devices at this angular position, the boss 1311 continuously abuts the groove wall at the second end 1239. That is, the direction of the force exerted by the external support platform on the bracket 13 is opposite to the direction of the force applied by the groove 1232 on the boss 1311, thereby enabling the bracket 13 to stably provide lateral support for mobile phones, tablets, or other electronic devices, improving the stability of the bracket 13 during support and preventing the supported electronic device from tipping over.

Figure 7:
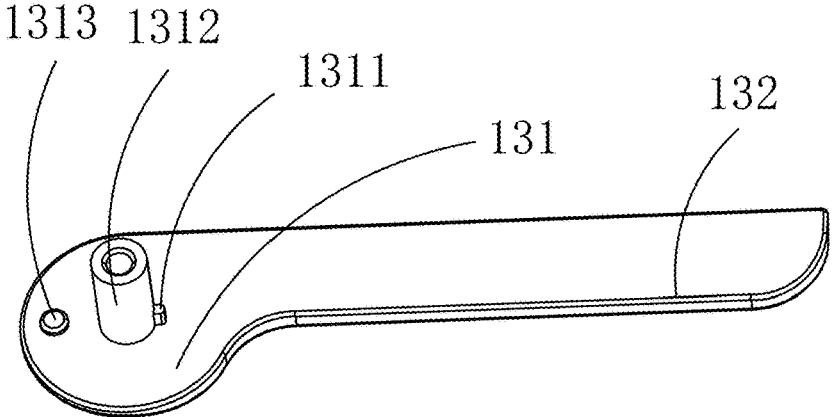
FIG. 7 is a schematic view illustrating the structure of the bracket of the connector provided in the first embodiment of the present invention.

Referring to FIGS. 5-7, further, a rotating shaft 1312 is provided on the rotating portion 131. The rotating portion 131 passes through the rotating shaft 1312 into the interior of the housing 123 and is rotatably connected to the housing 123, with the boss 1311 arranged around the rotating shaft 1312.

It can be understood that a rotating shaft 1312 is provided on the side of the rotating portion 131 adjacent to the terminal 12. The rotating shaft 1312 may pass through the through-hole 1231 on the housing 123 into the interior of the housing 123 to achieve a rotatable connection with the housing 123. The boss 1311 is arranged around the rotating shaft 1312, and the arcuate groove 1232 is configured corresponding to the rotation direction around the rotating shaft 1312, so that when the rotating portion 131 rotates, the boss 1311 moves within the groove 1232 along the rotation direction of the rotating shaft 1312. By providing the rotating shaft 1312 to extend into the housing 123, the connection between the bracket 13 and the housing 123 is tighter, which is beneficial for improving the stability of the rotational connection between the bracket 13 and the housing 123.

Referring to FIGS. 5-7, further, positioning protrusions 1313 are provided on the rotating portion 131 around the rotating shaft 1312. On the housing 123, a set of positioning grooves 1233 is provided corresponding to each positioning protrusion 1313. Each set of positioning grooves 1233 includes two positioning grooves 1233 arranged at an angle around the corresponding rotating shaft 1312. When each bracket 13 moves from the stored state to the rotated-out state, the positioning protrusion 1313 on each bracket 13 moves from one of the positioning grooves 1233 in the corresponding set on the housing 123 to the other positioning groove 1233 in the same set.

Specifically, in addition to the rotating shaft 1312 and the boss 1311, the rotating portion 131 on a bracket 13 may also be provided with at least one positioning protrusion 1313. On the housing 123, a set of positioning grooves 1233 is provided corresponding to each positioning protrusion 1313. Each set of positioning grooves 1233 includes two positioning grooves 1233 arranged at an angle around the rotating shaft 1312, and the distance between the two positioning grooves 1233 and the rotating shaft 1312 is the same. The two positioning grooves 1233 in each set correspond respectively to the stored state and the unfolded state of the bracket 13. When the bracket 13 is stored on the surface of the housing 123 of the terminal 12, the positioning protrusion 1313 engages one of the positioning grooves 1233 in the corresponding set, thereby limiting the bracket 13 in the stored state, fixing it in position, improving the stability of the bracket 13 when stored, and preventing rotation or displacement due to accidental contact. Under external force, when the rotating portion 131 rotates, driving the boss 1311, the supporting portion 132, and the positioning protrusion 1313 to rotate, the positioning protrusion 1313 disengages from the current positioning groove 1233, rotates to the other positioning groove 1233, and engages in that groove, thereby limiting the bracket 13 in the unfolded state and fixing it in position, improving the stability of the bracket 13 during unfolded support. Thus, by providing one positioning protrusion 1313 on each bracket 13 corresponding to two positioning grooves 1233 at different angles, the positioning protrusion 1313 engages different grooves in the stored and unfolded states, thereby achieving positional limiting of the bracket 13 in its current state and further improving the stability of the bracket 13 in both stored and unfolded supporting states.

Optionally, the positioning protrusion 1313 may be an elastic protrusion. The provision of the elastic protrusion allows it to disengage from the current positioning groove 1233 and move into the next positioning groove 1233 without affecting the rotation of the bracket 13.

Referring to FIG. 7, further, the positioning protrusion 1313, the rotating shaft 1312, and the boss 1311 on the rotating portion 131 are arranged in a linear distribution.

It can be understood that the rotating shaft 1312 is located between the positioning protrusion 1313 and the boss 1311, and the three are arranged linearly. This arrangement facilitates the positioning protrusion 1313 engaging with the positioning groove 1233 and the boss 1311 abutting the wall of the groove 1232 to limit both ends of the rotating shaft 1312, thereby enhancing the overall limiting effect on the rotating shaft 1312 through their combined action. In addition, the linear arrangement of the positioning protrusion 1313, the rotating shaft 1312, and the boss 1311 allows the limiting effect of the rotating shaft 1312 to be more balanced and more stable.

Referring to FIGS. 5 and 7, further, the connector 1 also includes a threaded member 14. The rotating shaft 1312 is hollow, and the threaded member 14 passes through the through-hole 1231 into the interior of the rotating shaft 1312 and is threadedly connected to the inner wall of the rotating shaft 1312.

It can be understood that the rotating shaft 1312 and the housing 123 are threadedly connected via the threaded member 14, which facilitates the quick disassembly between the bracket 13 and the housing 123, allowing timely maintenance or replacement of damaged components.

Figure 8:
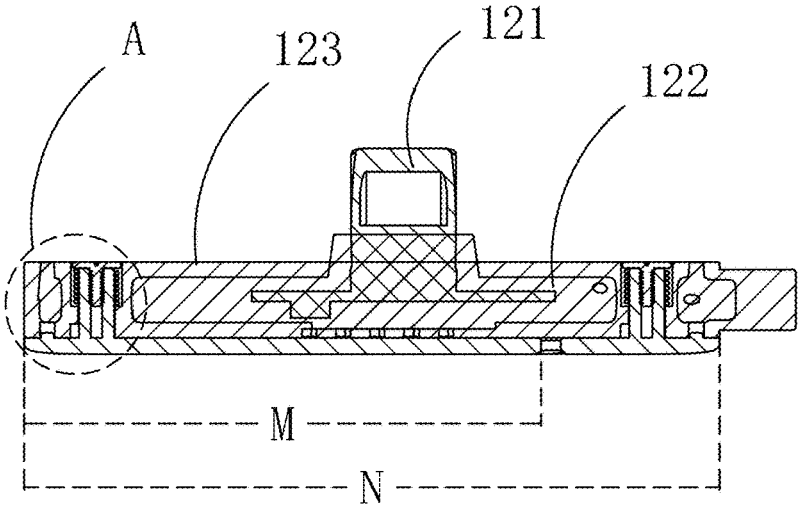
FIG. 8 is a sectional view of the connector provided in the first embodiment of the present invention.
Figure 9:
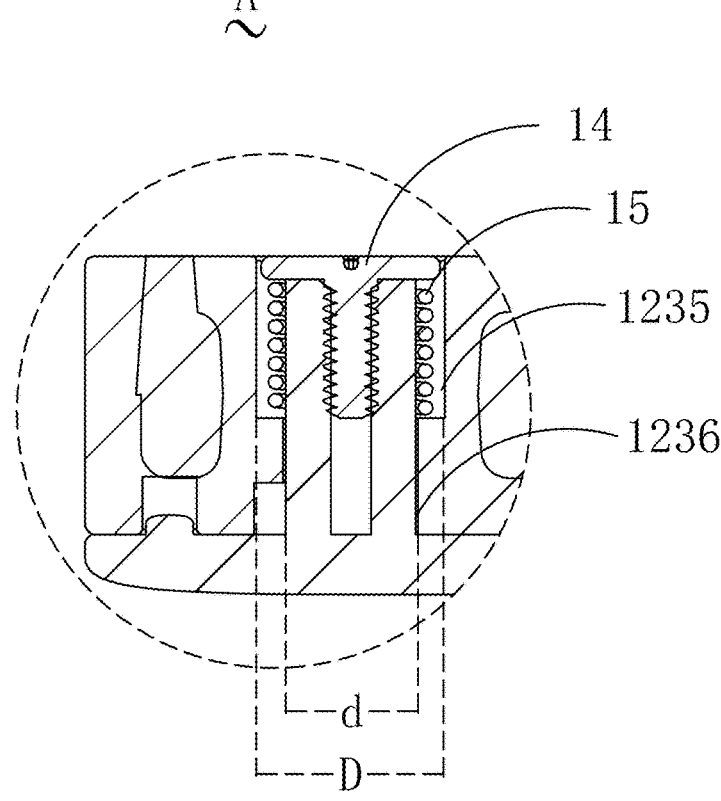
FIG. 9 is an enlarged view of portion A in FIG. 7.

Referring to FIGS. 8 and 9, further, the through-hole 1231 includes a first hole 1235 and a second hole 1236 communicating with the first hole 1235. The diameter D of the first hole 1235 (as shown in FIG. 9) is greater than the diameter d of the second hole 1236 (as shown in FIG. 9), and the rotating shaft 1312 passes through the second hole 1236 into the first hole 1235. An elastic member 15 is sleeved on the rotating shaft 1312 that passes through the second hole 1236, with both ends of the elastic member 15 abutting the threaded member 14 and the bottom wall of the second hole 1236, respectively.

Specifically, when the diameter D of the first through-hole 1235 is greater than the diameter d of the second hole 1236, after the rotating shaft 1312 passes through the second hole 1236 into the first hole 1235, an annular receiving space is formed between the rotating shaft 1312 and the wall of the second hole 1236. An elastic member 15 can be arranged within this receiving space, sleeved on the rotating shaft 1312, with both ends of the elastic member 15 abutting the threaded member 14 and the bottom wall of the second hole 1236, respectively. This arrangement allows the rotating shaft 1312, after being connected with the threaded member 14, to drive the threaded member 14 to move along the compression direction of the spring.

More specifically, when the support 13 rotates, the compression of the spring allows the entire support 13 to move along the compression direction of the spring, which drives the positioning protrusion 1313 on the rotating portion 131 to disengage from the current positioning slot 1233 and move to another positioning slot 1233. After the elastic member 15 expands, it drives the positioning protrusion 1313 to engage into the next positioning slot 1233. In this way, the arrangement of the elastic member 15 enables the positioning protrusion 1313 to disengage from the current positioning slot 1233 and engage into the next positioning slot 1233, preventing any adverse effect on the rotation of the support 13.

Optionally, the elastic member 15 can be a spring or made of an elastic material, which can be selected according to specific circumstances.

Referring to FIG. 8, further, the length M of the bracket 13 (as shown in FIG. 8) is greater than ⅔ of the overall length N of the wiring end 12 (as shown in FIG. 8) and less than the overall length N of the wiring end 12.

It can be understood that the wiring end 12 may be overall elongated, so as to allow the length M of the bracket 13 to be set as long as possible, thereby further improving the stability of the support.

It should be noted that the overall length N of the wiring end 12 of the connector 1 needs to be adapted to the shortest boundary length of the electronic device, thereby ensuring that the overall length N of the wiring end 12 allows the bracket 13, when unfolded, to support the electronic device in a vertical orientation.

It can be understood that the overall length and width of the bracket 13 are both smaller than the overall length and width of the outer surface of the wiring end 12, so that when the bracket 13 is stowed, its boundaries do not extend beyond those of the wiring end 12. Moreover, the overall length of the bracket 13 should be greater than two-thirds of the length of the wiring end 12 and less than the overall length of the wiring end 12, thereby ensuring that the bracket 13 provides sufficient support length when unfolded, which guarantees the stability of the support and the control of the support angle.

Further, the rotation angle of one bracket 13 is 0°-90°, while the rotation angle of the other bracket 13 is 0°-270°.

It can be understood that by limiting the rotation angles of the two brackets 13, the supporting angles of the brackets 13 during lateral support are defined. Moreover, by providing two brackets 13 with different rotation angles, the total rotation range of the two brackets 13 reaches 360°, which facilitates their complete storage in a rotationally symmetrical state. This ensures that the two brackets 13 can be fully accommodated within the housing 123 without protruding, further enhancing the stability of their storage.

Figure 10:
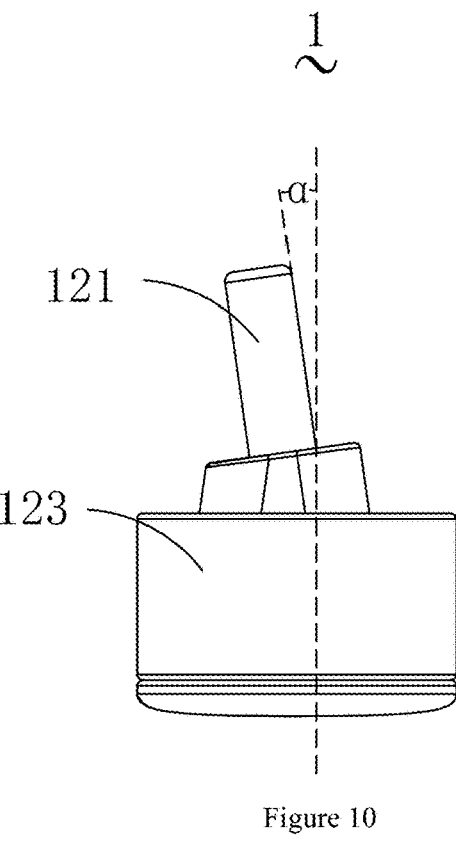
FIG. 10 is a side view of the connector provided in the first embodiment of the present invention.
Figure 10:

Referring to FIG. 10, further, the interface 121 is arranged inclined relative to the wiring end 12; the inclination angle α of the interface 121 relative to the wiring end 12 (as shown in FIG. 10, a) is 6°-15°.

It can be understood that by arranging the interface 121 inclined relative to the wiring end 12, when the mobile phone, tablet, or other electronic devices are vertically supported by the bracket 13 in this embodiment, the devices are tilted at a certain angle α relative to the supporting surface, making it more convenient for users to view the devices in a vertical orientation. Controlling the inclination angle α of the interface 121 relative to the wiring end 12 within the range of 6°-15° ensures that the interface is properly inclined while avoiding excessive tilt that could affect the electrical connection between the connector 1 and the electronic device.

Figure 11:
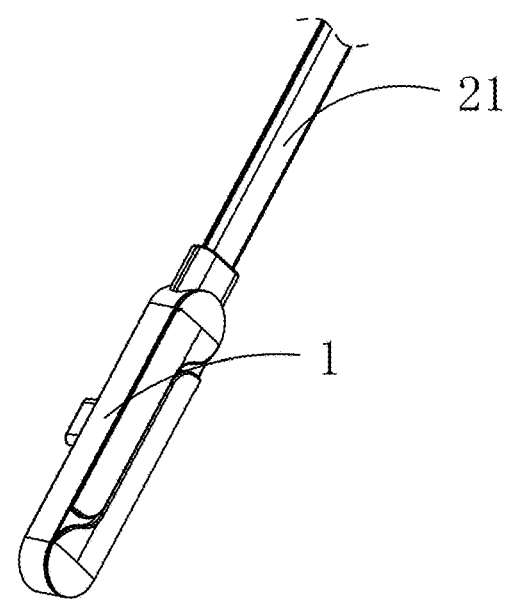
FIG. 11 is a perspective view of the charging cable provided in the second embodiment of the present invention.

Referring to FIG. 11, a second embodiment of the present invention provides a charging cable 2, which includes a cable body 21 and any one of the connectors 1 described in the first embodiment. The cable body 21 is electrically connected to the wiring end 12.

It can be understood that the charging cable 2 may serve as a charging cable or a data cable, capable of performing corresponding charging functions and/or data transmission functions.

Figure 12:
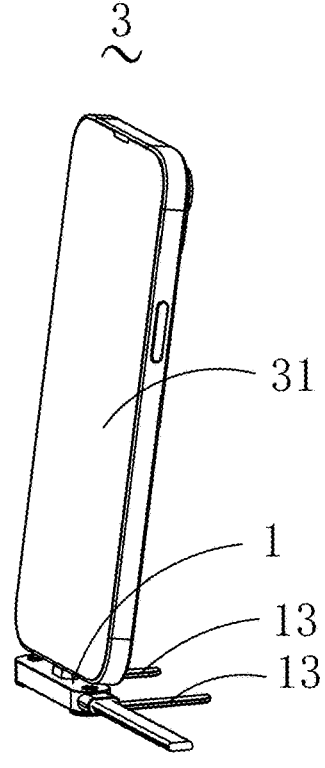
FIG. 12 is a perspective view illustrating two brackets supporting the electronic device in the third embodiment of the present invention.
Figure 13:
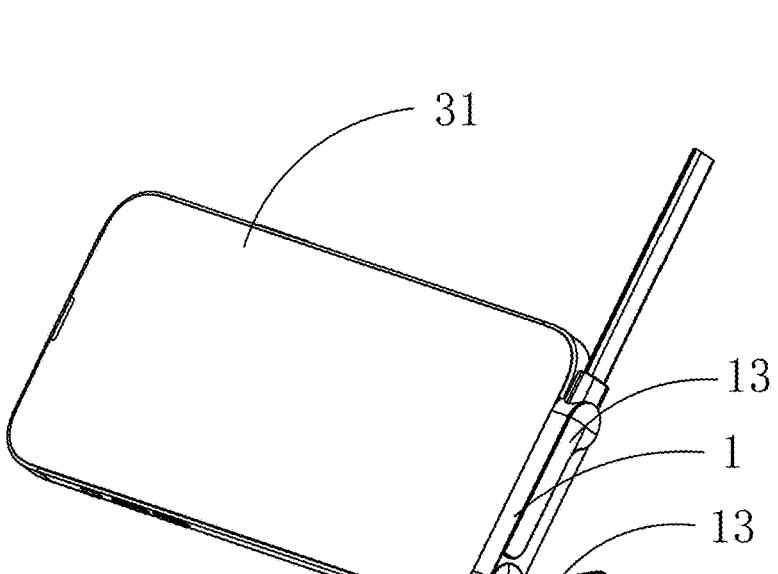
FIG. 13 is a first perspective view illustrating a single bracket supporting the electronic device in the third embodiment of the present invention.
Figure 14:
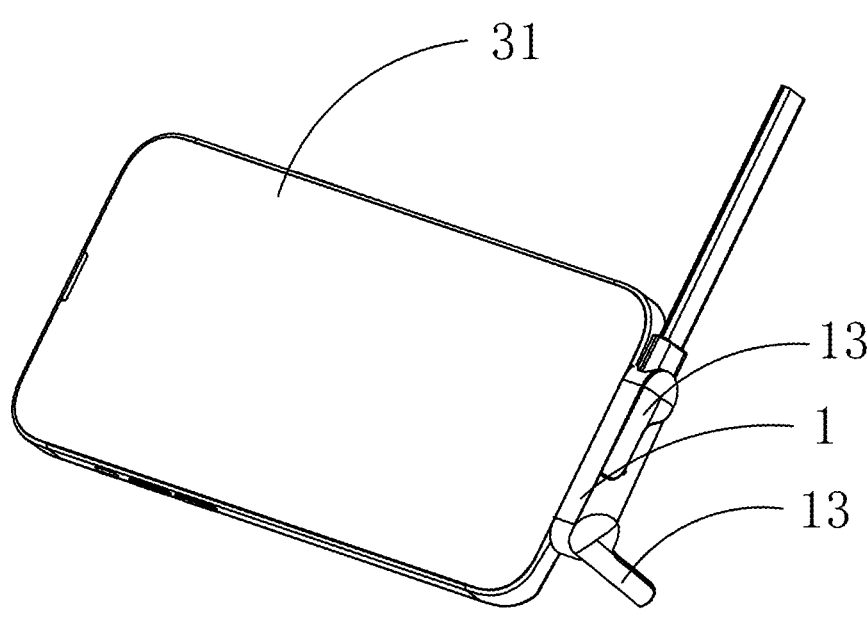
FIG. 14 is a second perspective view illustrating a single bracket supporting the electronic device in the third embodiment of the present invention.

Referring to FIGS. 12-14, a third embodiment of the present invention provides an electronic device 3, which includes an electronic device body 31 and any one of the connectors 1 described in the first embodiment. The electronic device body 31 is electrically connected to the connector 1.

It can be understood that the electronic device body 31 may include a mobile phone, tablet, power bank, TWS earphone case, rechargeable devices with cables, or data transmission devices.

Compared with the prior art, the connector of the present invention has the following advantages:

Compared with the prior art, the connector, charging cable, and electronic device of the present invention have the following advantages:

1. The present invention provides a connector, which includes a wiring end and a support bracket; one side of the wiring end is provided with an interface, and the two ends on the side of the wiring end opposite to the interface are respectively rotatably connected to a support bracket. The support bracket can be rotatably retracted into the side of the wiring end opposite to the interface or rotated outward to form a supporting structure. By arranging a support bracket at each end on the side of the wiring end opposite to the interface, when both support brackets are simultaneously unfolded on the wiring end, the expanded support brackets increase the support width range, allowing both ends of the boundaries of electronic devices such as mobile phones and tablets to be supported. This better accommodates the high center of gravity when mobile phones, tablets, or similar devices are placed vertically, thereby achieving vertical support for these devices and meeting users' needs for vertical support. In addition, setting two support brackets to unfold and support the two ends of the device's boundaries further improves the stability of vertical support. Moreover, when only one support bracket is unfolded, it can also provide lateral support for electronic devices such as mobile phones and tablets.

2. When the two support brackets of the present invention are retracted on the side of the wiring end opposite to the interface, the two support brackets are in a centrally symmetrical state, which better adapts to the shape of the wiring end. This allows both support brackets to be fully retracted within the housing without extending beyond the wiring end, thereby reducing the overall space occupied by the connector.

3. When one support bracket of the present invention is rotated open for support, a preset angle is formed between the expanded bracket and the bracket that remains retracted. The preset angle is 70°-120°, so that a preset angle is also formed between the expanded bracket and the electronic device connected to the interface. This facilitates supporting a smartphone, tablet, or other electronic device using the expansion of just one support bracket.

4. The connecting end of the present invention further includes an electrical connection structure and a housing, with the housing enclosing the electrical connection structure. The interface is connected to the electrical connection structure and exposed on one side of the housing. The support bracket includes a rotating portion and a supporting portion. Each end of the connecting end is provided with through holes corresponding to the rotating portions of the support brackets, and part of the rotating portion passes through the through hole into the interior of the connecting end to rotate with the connecting end. At least one rotating portion of the support bracket is provided with a protrusion, and a corresponding groove is provided on the housing. When the rotating portion drives the supporting portion to rotate and expand relative to the connecting end, the protrusion slides from a first end of the groove to a second end and abuts against the groove wall at the second end.

By providing a protrusion on the rotating portion and a corresponding groove on the connecting end, the protrusion is positioned within the groove. When the support bracket is in a retracted state, the protrusion is located at the first end of the groove; when the support bracket is rotated open, the rotating portion moves the protrusion along the groove from the first end to the second end, abutting against the groove wall at the second end. This limits the rotation of the rotating portion through the engagement of the protrusion with the groove wall at the second end, so that when the support bracket laterally supports a smartphone, tablet, or other electronic device at this angle, the protrusion continuously abuts the groove wall, improving the stability of the support bracket and preventing the supported device from tipping over.

5. The present invention provides a positioning protrusion on each support bracket corresponding to two positioning slots at different angular positions. When the support bracket is retracted or expanded, the positioning protrusion engages with the corresponding positioning slot, thereby limiting the support bracket in its current state and further improving the stability of the support bracket in both the retracted and expanded positions.

In addition, the positioning protrusion, the rotating shaft, and the protrusion are arranged linearly, which makes the rotation-limiting effect on the rotating shaft more balanced and the limiting effect more stable.

6. The connector of the present invention further includes a threaded member and an elastic member. The rotating shaft is hollow, and the threaded member passes through the through-hole into the interior of the rotating shaft and is threadedly connected to the inner wall of the rotating shaft. The through-hole comprises a first hole and a second hole that communicates with the first hole, wherein the diameter of the first hole is larger than that of the second hole, and the rotating shaft passes from the second hole into the first hole. An elastic member is sleeved on the portion of the rotating shaft that passes through the second hole, with its two ends abutting against the threaded member and the bottom wall of the second hole, respectively.

The threaded member achieves the connection between the rotating shaft and the housing, and the elastic member is sleeved on the rotating shaft to facilitate movement along the compression direction of the spring when the support bracket rotates. This enables the positioning protrusion on the rotating part to disengage from the current positioning slot and move to another positioning slot, and then, after the elastic member expands, drive the positioning protrusion to engage in the next positioning slot. In this way, the elastic member allows the positioning protrusion to move from the current slot to the next slot, avoiding interference with the rotation of the support bracket.

7. In the present invention, the interface is inclined relative to the wiring end; the inclination angle of the interface relative to the wiring end is 6°-15°. This design allows devices such as smartphones and tablets to tilt at a certain angle relative to the supporting surface when vertically supported by the bracket in this embodiment, making it easier for users to view the device in a vertical orientation.

8. The present invention also provides a charging cable, which has the same advantageous effects as the above-described connector, and details are not repeated here.

9. The present invention also provides an electronic device, which has the same advantageous effects as the above-described electronic device, and details are not repeated here. The foregoing is only the preferred embodiments of the present invention and is not intended to limit the invention. Any modifications, equivalent substitutions, or improvements made within the principles of the present invention should fall within the scope of protection of the present invention.

What is claimed is:

1. A connector, characterized by comprising:
a terminal and a bracket, an interface is provided on one side of the terminal, and each of the two ends of the side of the terminal opposite to the interface is rotatably connected with one of the brackets, the brackets are configured to rotate to be stored on the side of the terminal opposite to the interface, or to rotate outward to form a supporting structure;
wherein the terminal further comprises an electrical connection structure and a housing, the housing surrounding the electrical connection structure, and the interface being connected to the electrical connection structure and exposed on one side of the housing;
the bracket comprises a rotating portion and a supporting portion, and through-holes are formed at both ends of the housing corresponding to the rotating portion of each bracket, wherein part of the rotating portion passes through the through-holes into the interior of the terminal and is rotatably connected to the terminal;
a boss is provided on the rotating portion of at least one of the brackets, and a groove corresponding to the boss is formed on the housing;
when the rotating portion drives the supporting portion to rotate and unfold relative to the housing, the boss is driven to slide from a first end of the groove to a second end of the groove, and to abut against the groove wall at the second end;
a rotating shaft is provided on the rotating portion, the rotating portion penetrating into the interior of the housing through the rotating shaft and being rotatably connected to the housing, and the boss being disposed around the rotating shaft;
positioning protrusions are arranged around the rotating shaft on the rotating portion, and a set of positioning slots is correspondingly provided on the housing for each positioning protrusion, each set of positioning slots comprising two positioning slots arranged at an angle with respect to the corresponding rotating shaft;
when each bracket moves from a stored state to a rotated and unfolded state, the positioning protrusion on each bracket moves from one of the positioning slots in the corresponding set of positioning slots on the housing to the other positioning slot in the same set, the positioning protrusion, the rotating shaft, and the boss on the rotating portion are linearly arranged;
the connector further comprises a threaded member and an elastic member, wherein the rotating shaft is hollow, the threaded member passes through the through-hole into the interior of the rotating shaft and is threadedly connected to the inner wall of the rotating shaft;
the through-hole comprises a first hole and a second hole communicating with the first hole, the diameter of the first hole being larger than that of the second hole, and the rotating shaft passing from the second hole into the first hole;
an elastic member is sleeved over the rotating shaft within the second hole, with both ends of the elastic member respectively abutting against the threaded member and the bottom wall of the second hole;

when the bracket rotates, the elastic member allows the bracket to move along a compression direction of the elastic member, driving the positioning protrusion to disengage from a current positioning slot and move to another positioning slot, and after the elastic member expands, the positioning protrusion is driven to engage with the another positioning slot.

2. The connector according to claim 1, wherein when the two brackets are stored on the side of the terminal opposite to the interface, the two brackets are in a centrally symmetrical state.

3. The connector according to claim 1, wherein when one of the brackets is rotated outward to provide support, a preset angle is formed between the unfolded bracket and the non-unfolded bracket; the preset angle is 70°-120°.

4. The connector according to claim 1, wherein the length of the bracket is greater than ⅔ of the overall length of the terminal and less than the overall length of the terminal.

5. The connector according to claim 1, wherein the interface is inclined relative to the terminal; the inclination angle of the interface relative to the terminal is 6°-15°.

6. A charging cable, comprising a cable body and the connector according to claim 1, the cable body being electrically connected to the terminal.

7. An electronic device, comprising the connector according to claim 1 and an electronic device main body, the electronic device main body being electrically connected to the connector.

\* \* \* \* \*